(12) United States Patent
Quintero

(10) Patent No.: US 10,788,971 B2
(45) Date of Patent: Sep. 29, 2020

(54) DATA ORGANIZING STICKERS

(71) Applicant: Microsoft Technology Licensing, LLC, Redmond, WA (US)

(72) Inventor: Megan M Quintero, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 40 days.

(21) Appl. No.: 15/636,250

(22) Filed: Jun. 28, 2017

(65) Prior Publication Data

US 2019/0004689 A1   Jan. 3, 2019

(51) Int. Cl.
| | |
|---|---|
| G06F 3/0484 | (2013.01) |
| G06Q 10/10 | (2012.01) |
| G06F 16/28 | (2019.01) |
| G06F 3/0482 | (2013.01) |
| H04L 12/58 | (2006.01) |

(52) U.S. Cl.
CPC ........ *G06F 3/04847* (2013.01); *G06F 3/0482* (2013.01); *G06F 16/287* (2019.01); *G06Q 10/10* (2013.01); *G06Q 10/107* (2013.01); *H04L 51/04* (2013.01)

(58) Field of Classification Search
CPC ........... G06F 17/30601; G06F 3/04847; G06F 3/0482; G06F 16/287; H04L 51/04; G06Q 10/107; G06Q 10/10
See application file for complete search history.

(56) References Cited

U.S. PATENT DOCUMENTS

| | | | |
|---|---|---|---|
| 5,873,108 A | 2/1999 | Goyal et al. | |
| 6,029,164 A | 2/2000 | Birrell et al. | |
| 7,509,569 B2 | 3/2009 | Barrus | |
| 8,560,619 B1 | 10/2013 | Huston | |
| 8,856,244 B2 | 10/2014 | Madnani | |
| 9,401,883 B2* | 7/2016 | Vitaldevara | G06Q 10/10 |
| 2005/0222985 A1* | 10/2005 | Buchheit | G06Q 10/107 |
| 2005/0223057 A1* | 10/2005 | Buchheit | G06Q 10/107 709/203 |
| 2005/0234910 A1 | 10/2005 | Buchheit et al. | |

(Continued)

FOREIGN PATENT DOCUMENTS

EP   1003098 A2   9/2005

OTHER PUBLICATIONS

Matteson, Scott, "Use labels in Gmail for better e-mail management", http://www.techrepublic.com/blog/google-in-the-enterprise/use-labels-in-gmail-for-better-e-mail-management/, Published on: Jan. 29, 2014, 14 pages.

(Continued)

*Primary Examiner* — Thu V Huynh
(74) *Attorney, Agent, or Firm* — Schwegman Lundberg & Woessner, P.A.

(57) ABSTRACT

A server system suitable for organizing files using stickers is provided. The server system determines a plurality of stickers applicable to data presented on a user interface of a client device, and causes presentation of the determined plurality of stickers on the user interface of the client device. The server system receives a selection of a sticker from the plurality of stickers. The server system then applies the selected sticker to the presented data, whereby the application of the selected sticker causes the presented data to be classified based on the selected sticker.

19 Claims, 12 Drawing Sheets

(56) References Cited

U.S. PATENT DOCUMENTS

| | | | |
|---|---|---|---|
| 2007/0226204 A1* | 9/2007 | Feldman | G06F 16/30 |
| 2009/0006285 A1* | 1/2009 | Meek | G06Q 10/10 |
| | | | 706/12 |
| 2009/0235167 A1* | 9/2009 | Boyer | G06F 17/30864 |
| | | | 715/708 |
| 2011/0191428 A1* | 8/2011 | Nairn | G06F 15/16 |
| | | | 709/206 |
| 2011/0307804 A1* | 12/2011 | Spierer | G06Q 10/107 |
| | | | 715/752 |
| 2014/0082521 A1 | 3/2014 | Carolan et al. | |
| 2014/0114973 A1 | 4/2014 | Wetherell et al. | |
| 2014/0344259 A1* | 11/2014 | Horling | G06F 17/3053 |
| | | | 707/723 |
| 2014/0372446 A1* | 12/2014 | Bell | G06F 17/30994 |
| | | | 707/740 |
| 2015/0106358 A1 | 4/2015 | Nachum et al. | |
| 2015/0172246 A1 | 6/2015 | Velummylum et al. | |
| 2016/0191451 A1* | 6/2016 | Volach | H04L 67/24 |
| | | | 709/206 |
| 2016/0294894 A1 | 10/2016 | Miller | |
| 2018/0330334 A1* | 11/2018 | Gowru | G06Q 10/1093 |

OTHER PUBLICATIONS

"Using Labels / Folders—ProtonMail Support", https://protonmail.com/support/knowledge-base/creating-folders/, Retrieved on: Apr. 18, 2017, 17 pages.

"Mail Tutorial: Sort messages using labels", http://www.opera.com/help/tutorials/mail/sort/, Retrieved on: Apr. 18, 2017, 3 pages.

Kaufman, Lori, "Gmail Guide: Inbox Management and Labels", Retrieved From: https://www.howtogeek.com/school/gmail-guide/lesson3/, Retrieved On: Nov. 9, 2018, 24 Pages.

Kaufman, Lori, "Gmail Guide: Mail Filters and the Star System", Retrieved From: https://www.howtogeek.com/school/gmail-guide/lesson4/, Retrieved on: Nov. 9, 2018, 20 Pages.

"International Search Report and Written Opinion Issued in PCT Application No. PCT/US2018/033993", dated Nov. 26, 2018, 10 Pages.

* cited by examiner

DATA ORGANIZING STICKERS

TECHNICAL FIELD

The subject matter disclosed herein generally relates to machines configured to the technical field of special-purpose machines that facilitate organizing data, including computerized variants of such special-purpose machines and improvements to such variants, and to the technologies by which such special-purpose machines become improved compared to other special-purpose machines that facilitate organizing data. Specifically, the present disclosure addresses systems and methods that manage the generation and application of stickers and other forms of labels to data and to organizing and accessing the data based on classifications associated with the stickers or labels.

BACKGROUND

Managing content with mobile devices and software applications involves multiple user actions, which may be tedious and waste computing resources. Conventionally, users in the mobile space (e.g., mobile e-mail space) can create folders to store content. However, moving content between these folders can be time consuming and difficult when dealing with a mobile device. Additionally, with conventional approaches, there is no way to organize data from different applications for easy access. That is, the user would need to access individual files of different applications (e.g., e-mail application, calendar application, to-do list application) in order to find data that may be related to each other.

BRIEF DESCRIPTION OF THE DRAWINGS

Some embodiments are illustrated by way of example and not limitation in the figures of the accompanying drawings.

DETAILED DESCRIPTION

Figure 1:
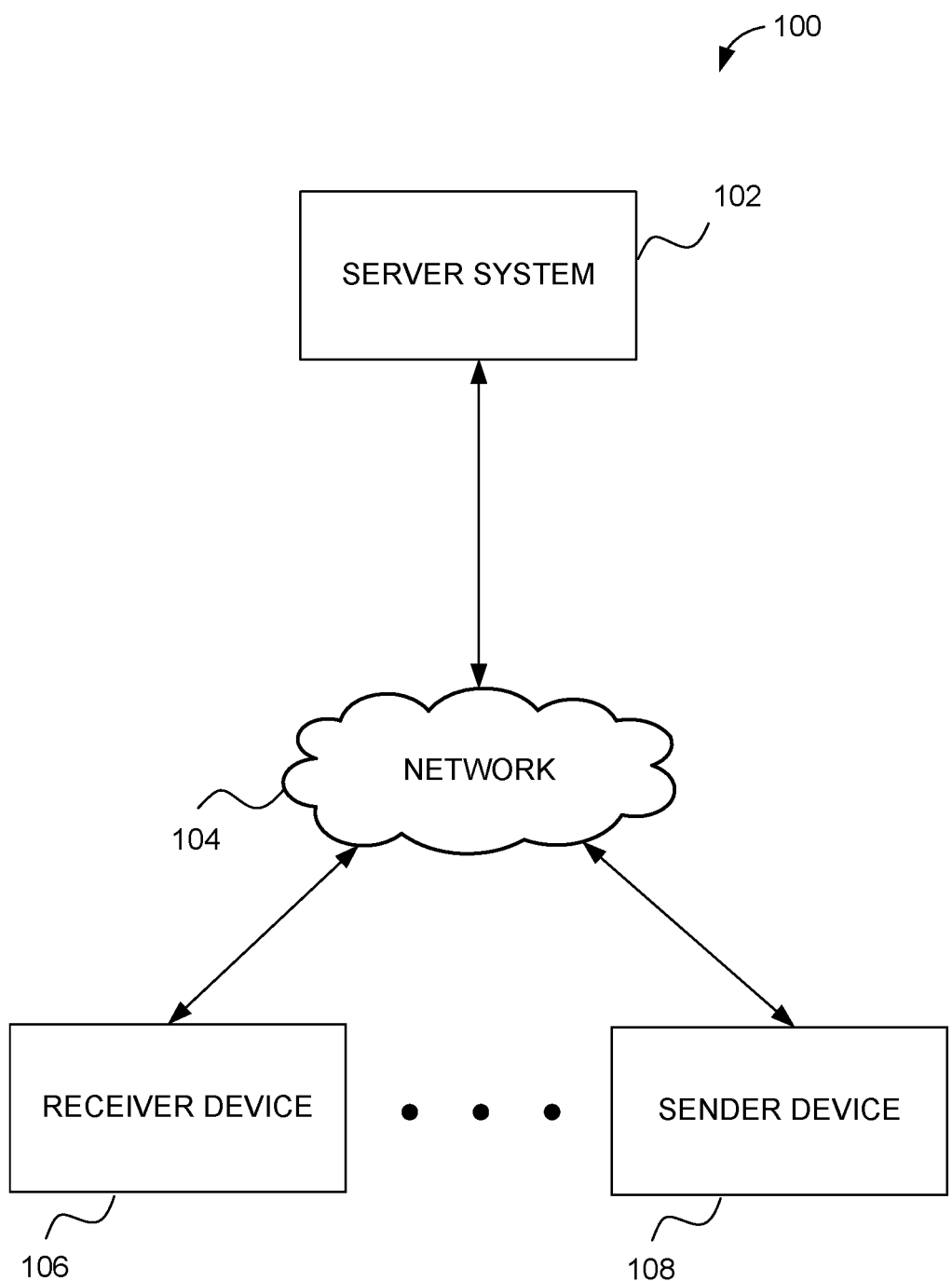
FIG. 1 is a block diagram illustrating an example environment for organizing data using stickers.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) facilitate classifying and accessing data using stickers. A sticker comprises a label that may serve as metadata which, when applied to data, classifies the data accordingly. The sticker may correspond to a graphical item (e.g., an icon or emoji), which is "stuck on" or otherwise applied to the data to graphically identify the data as being classified or labeled. In some embodiments, the application of the sticker to data causes a data storage to be updated (e.g., a data storage storing the data) to indicate an association of the sticker with the data. In other embodiments, the application of the sticker to data causes the data itself (e.g., a header) to include the association of the sticker (e.g., include the metadata).

In particular, example embodiments provide mechanisms and logic that provides customizable stickers for classifying and later accessing data including e-mails, calendar events, files, to-do lists or tasks list, or any other types of classifiable data. Accordingly, the mechanisms and logic may receive an indication to present a plurality of stickers that may be applicable to data that is being presented. The mechanisms and logic determines the plurality of stickers that are applicable to the presented data and causes the plurality of stickers to be presented. The mechanisms and logic receives a selection of a sticker from the plurality of stickers, and applies the selected sticker to the presented data, which causes the presented data to be classified based on the selected sticker. In some embodiments, the mechanisms and logic performs one or more actions associated with the selected sticker on the data (e.g., archive, delete, move). The application and utilization of the stickers may occur on a mobile device in accordance to example embodiments.

As a result, one or more of the methodologies described herein facilitate solving the technical problem of organizing and accessing data in a quick and efficient manner. As such, one or more of the methodologies described herein may obviate a need for certain efforts or resources that otherwise would be involved in performing numerous actions in order to organize data (e.g., create folders, access folders, drag and drop files into folders) and search for, or navigate to, various locations in order to access the organized data. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a block diagram illustrating an example environment 100 for classifying and organizing data using stickers. In example embodiments, a server system 102 comprises one or more servers configured to quickly organize data by classifying (also referred to herein as "tagging") the data with a sticker, creating new stickers, and accessing classified data (also referred to herein as "tagged data") based on a selection of a sticker. The tagging of data (or removing a sticker from tagged data) may also automatically initiate a action or rule associated with the sticker. Some of the actions or rules include, for example, archiving the data, deleting the data, forwarding the data, moving the data (e.g., to a particular folder), setting a reminder to the user regarding the data, and flagging the data. The server system 102 will be discussed in more detail in connection with FIG. 2 below.

The server system 102 may be coupled via a network 104 to one or more client devices (e.g., receiver device 106 and sender device 108). One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The receiver device 106 is a device of a user (e.g., receiver), which is used to receive data (e.g., receive an e-mail) and display information (e.g., via user interfaces) including the received data. Similarly, the sender device 108 is a device of a second user (e.g., sender), which is used to send data (e.g., send an e-mail) and display information. The receiver device 106 and the sender device 108 may comprise, but is not limited to, a smartphone, tablet, laptop, multi-processor system, microprocessor-based or programmable consumer electronics, game console, set-top box, or any other device that a user utilizes to communicate over the network 104. In example embodiments, the receiver device 106 and sender device 108 may comprise a display module (not shown) to display information (e.g., in the form of user interfaces). In some embodiments, the receiver device 106 and sender device 108 may comprise one or more of a touch screen, camera, keyboard, microphone, and Global Positioning System (GPS) device.

In example embodiments, the receiver devices present user interfaces that allow their respective users to view data, classify data using stickers, create new stickers, change attributes of existing stickers, and access classified data. In some embodiments, the receiver devices make service calls to the server system 102 to cause the presentation of the user interfaces (e.g., obtain the data to display the user interfaces). In alternative embodiments, the some of the functions of the server system 102 (discussed below) may be performed at the client device.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client devices (e.g., receiver device 106 and sender device 108) may be embodied within the environment 100. Furthermore, some components or functions of the environment 100 may be combined or located elsewhere in the environment 100. For example, some of the functions of the server system 102 may be embodied within the client device.

Figure 2:
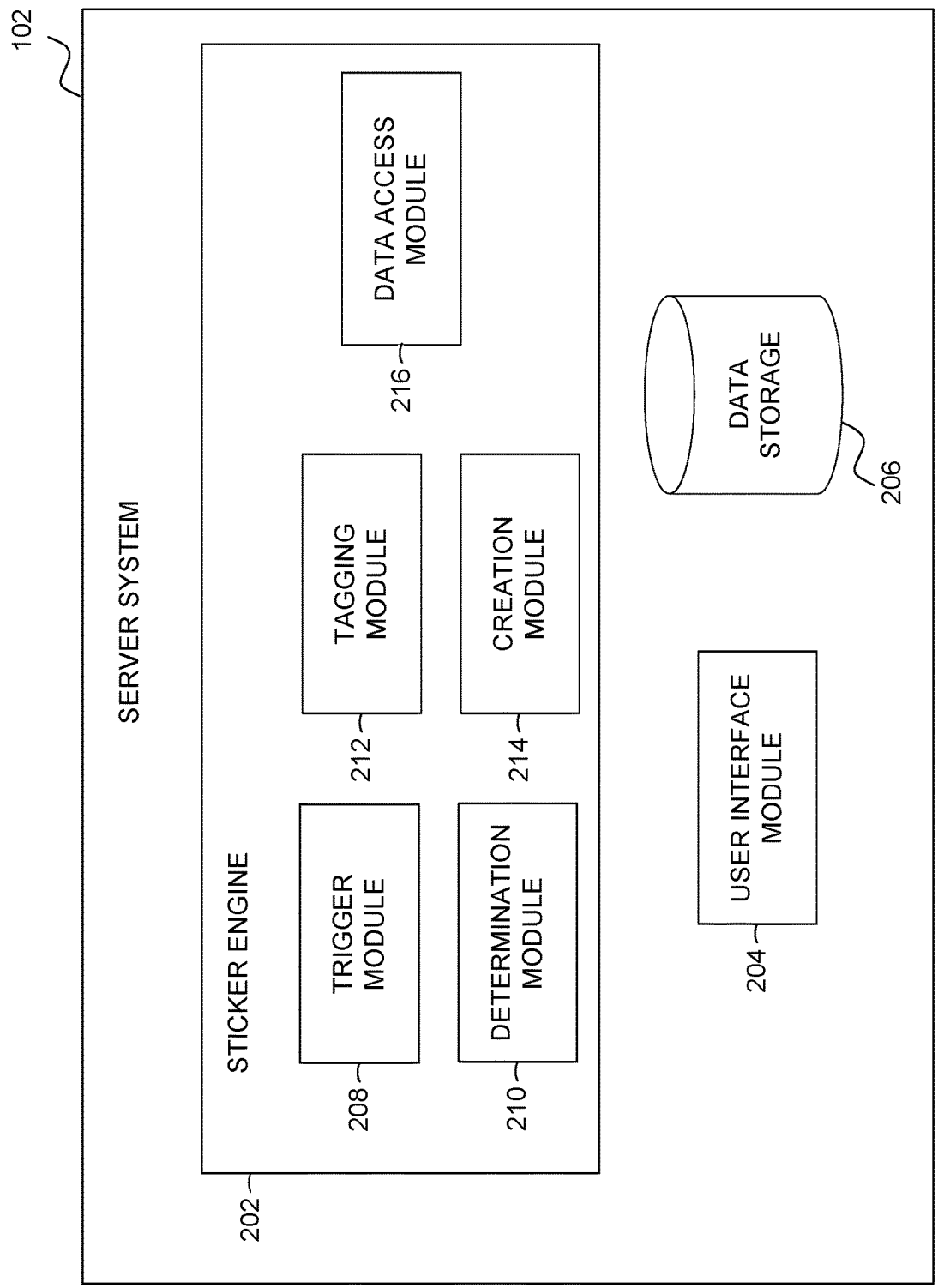
FIG. 2 is a block diagram illustrating components within a server system in accordance with an example embodiment.

FIG. 2 is a block diagram illustrating an example embodiment of components within the server system 102 in accordance with an example embodiment. In example embodiments, the server system 102 performs operations to classify and organize data using stickers, create new stickers for use in classifying data, and access classified data based on a selection of a sticker. To enable these operations, the server system 102 comprises a sticker engine 202, a user interface module 204, and a data storage 206 all of which are configured to communicate with each other (e.g., over a bus, shared memory, or a switch).

The user interface module 204 is configured to cause presentation of user interfaces on the client devices (e.g., receiver device 106). In example embodiments, the user interface module 204 generates and transmits instructions to the client devices for rendering and display of the user interfaces. In other embodiments, the user interface module 204 may generate and present the user interfaces. The user interfaces module 204 may provide user interfaces for classifying data, accessing classifed data, presenting the classified data, creating new stickers, or adjusting attributes (e.g., actions or rules) of existing stickers.

The data storage 206 is configured to store information regarding stickers, the association of stickers with classified data, and in some cases, the classified data itself. The information may include the various stickers established (e.g., created) or used by the user along with indications of attributes (e.g., actions or rules) and account preferences (e.g., stickers applicable for all accounts or just particular accounts of the user) associated with the stickers (also referred to as "metadata"). While the data storage 206 is shown to be a part of the server system 102, in some embodiments, the data storage 206 may be located elsewhere in the environment 100 and be communicatively coupled to the server system 102. Additionally, any number of data storage 206 may be used to store various types of data accessible and taggable by example embodiments.

The sticker engine 202 is configured to classify data using stickers, create new stickers for use in classifying data, adjust attributes of existing stickers, and access classified data. Accordingly, the sticker engine 202 comprises a trigger module 208, a determination module 210, a tagging module 212, a creation module 214, and a data access module 216 in accordance with one example embodiment.

In example embodiments, the trigger module 208 is configured to activate sticker functions at the server system 102. In example embodiments, the trigger module 208 receives an indication to present a plurality of stickers that are applicable to data that is being presented to a user on their client device. For example, the data may comprise an e-mail, a calendar event, or a file. While viewing the data (e.g., an e-mail in an e-mail application), the user may activate (e.g., select an icon or button) that provides an indication (e.g., signal) to the trigger module 208 that the user wants to classify or tag the data that the user is viewing. In other embodiments, the trigger module 208 receives an indication to present a plurality of stickers that the user has used to classify data with so that the user can access previously classified data of a particular classification (e.g., tagged by a particular sticker). Upon receiving one of these indications, the trigger module 208 triggers one or more of the other components of the sticker engine 202 to perform their respective functions.

The determination module 210 is configured to determine stickers to present to the user at the client device and in some embodiments, a priority for presenting the stickers in response to the indication to present the plurality of stickers received by the trigger module 208. As a base, the determination module 210 determines most frequently used stickers by the user. Sticker usage may be tracked (e.g., by the tagging module 212) and stored (e.g., in the data storage 206). Additionally, because some stickers may only be applicable (or relevant) to some types of data and not others, the determination module 210 determines most likely applicable stickers for the data that is being presented. In example embodiments, the determination module 210 identifies one or more attributes associated with the data being presented to the user. The attributes may comprise, for example, a sender or sender domain of the data, a category (e.g., e-mail classification) of the data, or a receiver e-mail account that receives the data. In some cases, the category is a message property that may be identified from a header of the data or message (e.g., e-mail).

With respect to the receiver e-mail account, the user (e.g., receiver at the receiver device 106) may have more than one e-mail account (e.g., one or more work accounts, one or more personal accounts). Each account of the user may have a different set of stickers associated with it. Thus, if an e-mail is for work, the determination module 210 will not suggest stickers applicable to the user's personal account. In some embodiments, a database (e.g., data storage 206) stores information regarding the sets of stickers applicable for each e-mail account. Alternatively, the information may be a property of the message.

Further with respect to the sender or sender domain (collectively referred to as "sender"), if the determination module 210 can identify the sender as a particular sender or a particular sender type that the determination module 210 has knowledge of (e.g., from past interactions, from a classification type), a corresponding sticker may be presented (e.g., in a top 5 list of stickers) or presented higher on a list of stickers suggested to the user. For example, if the sender of an email is an airline or hotel, then the determination module 210 will suggest a travel sticker higher on the list of stickers presented to the user. Further still, the determination module 210 may determine stickers to present based on past usage of stickers for a particular sender or sender type, and suggest these stickers higher on the list. The information regarding past usage and prior knowledge can be stored at, and access from, a database (e.g., the data storage 206).

As such, the suggested list of stickers presented to the user at the client device may start with the most frequently used as a base layer. Then, the determination module 210 adjusts the list based on, for example, the receiver account (e.g., work e-mail account, personal e-mail account), category of the data, the sender (or sender domain), and/or any prior interactions for data of the same or similar type. The determination module 210 provides the list of stickers to the user interface module 204 for presentation on the client device. In some embodiments, the list of stickers is provided in a menu that is overlaid over the presented data (e.g., presented as a menu over a displayed e-mail).

The tagging module 212 is configured to tag or classify data with a selected sticker. Accordingly, the tagging module 212 receives a selection of the sticker from the presented list of stickers applicable to the data. In response, the tagging module 212 tags the data, which causes the data to be classified based on the selected sticker. For example, if the selected sticker is a "wedding planning" sticker, then the data is categorized as wedding planning data. The categorization of the data is stored to the data storage 206 (or stored within the data itself), and is later used to access data that is classified or tagged with the same sticker.

When the data is tagged or classified with a sticker, actions or rules associated with the sticker may be automatically performed. For example, upon classifying the data, the data, in addition to being classified, may be archived, deleted, forwarded, moved, flagged, set a reminder (e.g., follow-up or snooze), or any other action that may be performed with the data. Similarly, upon removal of the sticker from the data, the data may be archived or deleted, for example. It is noted that data may be classified with more than one sticker and that other actions (not listed) may be automatically performed when the sticker is applied or removed from the data. The actions are configured (or updated) via a customization user interface, which is discussed in more detail below.

The creation module 214 is configured to create new stickers. Accordingly, the creation module 214 receives, from the client device, an indication to create a new sticker. In response, the creation module 214, via the user interface module 204 provides, to the client device, one or more user interfaces for creating the new sticker (e.g., customization user interface). The one or more user interfaces include a description of the new sticker and fields for indicating one or more actions that occur (e.g., rules that apply) upon application or removal of the new sticker. The creation module 214 then creates the new sticker based on inputs received via the one or more user interfaces. In some cases, the creation module 214 receives an indication of one or more receiver e-mail accounts of the user that the new sticker is to be associated with resulting in the new sticker only being suggested for the indicated receiver e-mail account(s). Subsequently, the data storage 206 is updated with the new sticker that is associated with the user of the client device and, in some cases, associated with particular e-mail (receiver) accounts of the user.

In example embodiments, the creation module 214 is also used to adjust attributes of an existing sticker. For instance, the user may decide to change an action/rule to be automatically performed in connection with the application or removal of the sticker from the data. The creation module 214 provides the customization user interface for the modification or adjustments to the parameters.

The data access module 216 is configured to access tagged or classified data based on a selected sticker. In example embodiments, the data access module 216 receives an indication of a sticker for which a user is interested in viewing data tagged with (e.g., classified by) the indicated sticker. In some embodiments, the indication is received while the user is viewing a piece of classified data and decides to view other data classified with the same sticker. In other embodiments, the data access module 216 receives an input (e.g., keyword) in a search box (e.g., via the interface module 204) that indicates a classification or name of a sticker. The data access module 216 identifies, based on stickers associated with the user (e.g., from the data storage 206), that the input corresponds to one or more of the stickers utilized by the user. In embodiments where more than one sticker is identified, the data access module 216 presents (e.g., via the interface module 204) the set of identified stickers from which the indication of the sticker the user is interested in is selected.

In response to receiving the indication of the sticker (or if only one sticker corresponds to a search input), the data access module 216 identifies data that is tagged or classified with the indicated sticker. Accordingly, the data access module 216 accesses data storage (e.g., the data storage 206) and identifies data that is tagged or classified by the indicated sticker. The data may comprise e-mails, calendar events, files, to-do lists, or any other types of taggable data. As such, data classified with the same sticker can be accessed and compiled from more than one application (e.g., e-mail application, calendar application, to-do list application) and/or more than one data storage. The data access module 216 may then provide the identified data (or provide an indication of the identified data) to the user interface module 204, which causes the presentation of the classified data on the client device. Because different data types (e.g., e-mail, calendar events, tasks or to-do lists, files) may be classified, different types of data across different applications can be accessed and recalled with a simple selection of a sticker.

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The server system 102 may comprise other components not pertinent to example embodiments that are not shown or discussed. Further still, one or more of the components of the server system 102 may be located at the receiver device 106.

Figure 3A:
FIG. 3A-FIG. 3C illustrate user interfaces of an example flow for applying a sticker to an e-mail in accordance with an example embodiment.
Figure 3B:
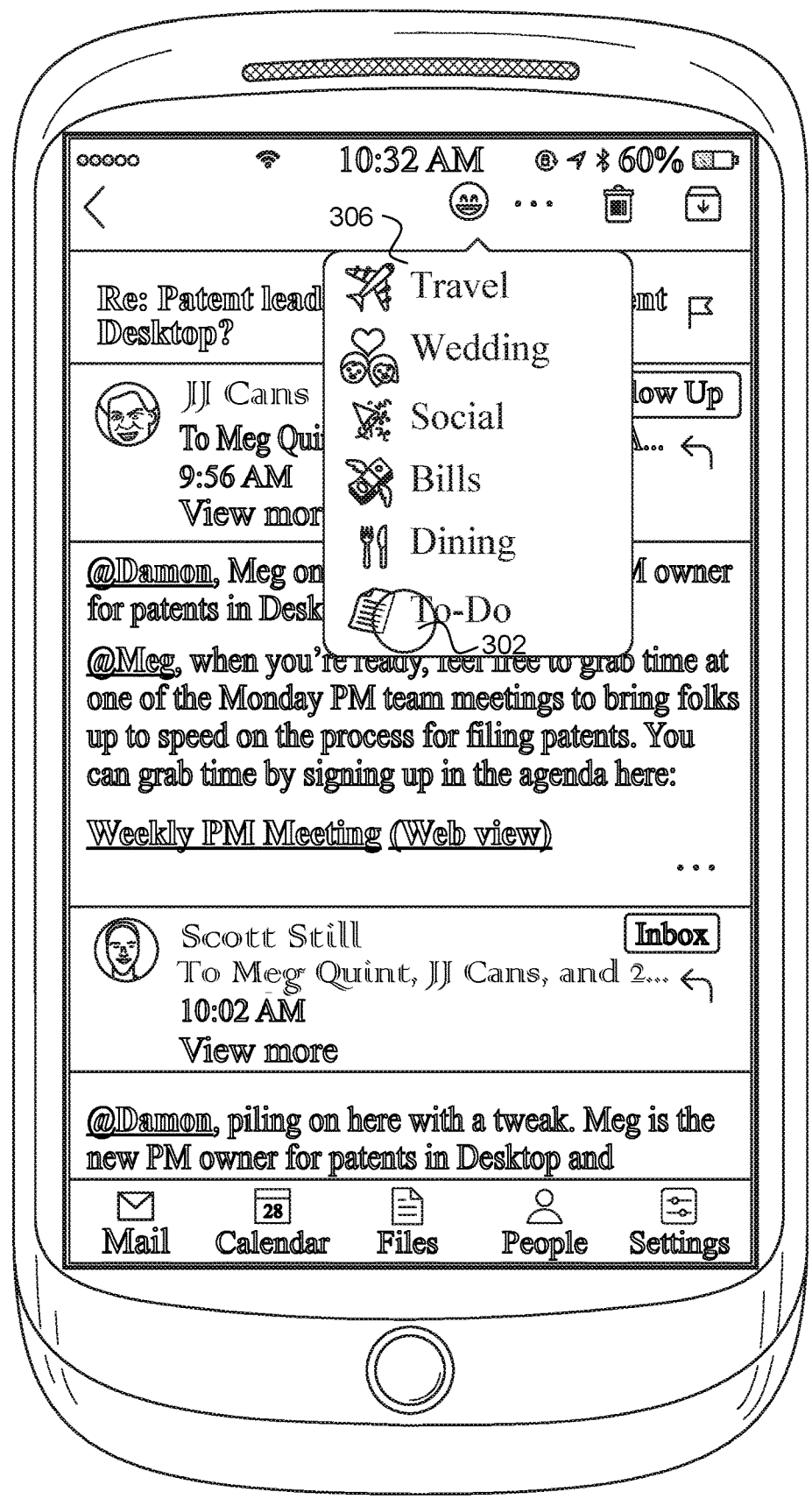
Figure 3C:
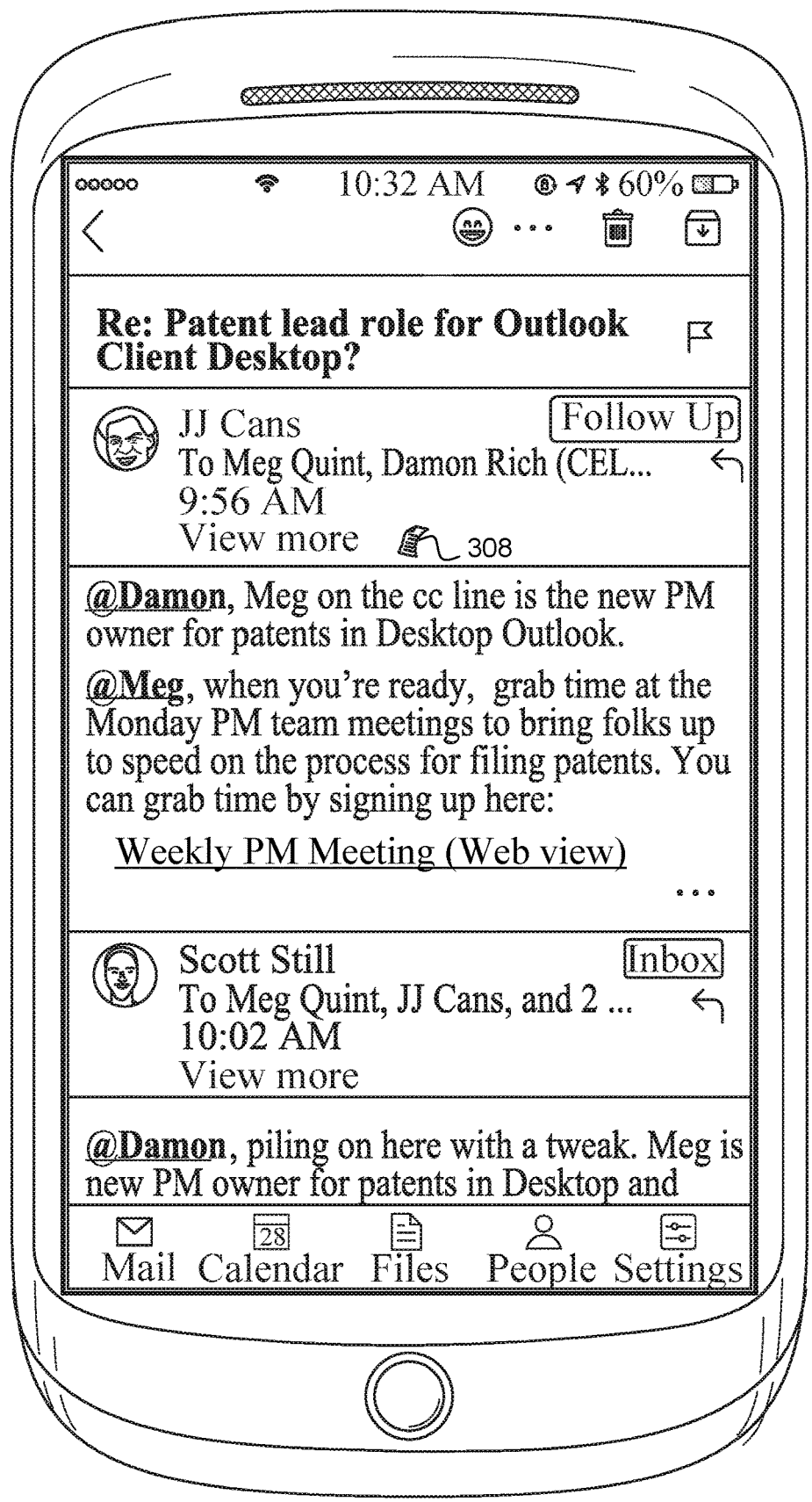

FIG. 3A-FIG. 3C illustrate user interfaces (UIs) of an example flow for applying a sticker to data (e.g., an e-mail) resulting in classifying the data, in accordance with an example embodiment. The UIs are rendered and displayed on the client device (e.g., receiver device 106). FIG. 3A illustrates a UI presenting data on the client device. In the present example, the data is an e-mail regarding a work project. The data is displayed on a mobile device of the user (e.g., the receiver of the e-mail). The user may classify the e-mail by selecting a sticker activation icon 300. In a mobile device embodiment, the user may select the sticker activation icon 300 by tapping (e.g., shown as circle 302) on the sticker activation icon 300.

In response to the selection of the sticker activation icon 300, a menu or list of a plurality of stickers 306 (e.g., icons that represent different classifications) is presented in the UI as shown in FIG. 3B. The menu or list 306 may be presented as an overlay over the e-mail. The plurality of stickers displayed in the menu or list 306 is determined by the determination module 210 to be applicable (or most relevant) to the e-mail. For example, the plurality of stickers may include stickers that are more frequently or recently used by the user, specific to the e-mail account that received the e-mail (e.g., work e-mail account), based on the sender, or based information from the e-mail itself (e.g., header information or classification information).

The user may select one of the plurality of stickers to apply to the e-mail. In the mobile device embodiment, the user selects the sticker by tapping (e.g., shown as circle 302) on the sticker. In the present example, the user selects the "To-Do" sticker. Tagging the data (also referred to as "applying the sticker") classifies the data according to the sticker, and may trigger automatic actions or rules associated with the sticker. In the present example, the e-mail is classified as "To-Do," which may cause the e-mail to be flagged, moved to a To-Do folder, set a reminder for the user (e.g., to follow up), archive the e-mail, or any other action/rule that is established for the "To-Do" sticker.

Once tagged or classified, the e-mail shows a sticker icon 308 that corresponds to the selected sticker. Each time the e-mail is recalled, the sticker icon 308 will be presented. The user may select the sticker icon 308 to access other data that have been tagged or classified with the same sticker as will be discussed further below.

If none of the stickers on the menu of list 306 are appropriate, the user may select an option to create a sticker. For example, the menu or list 306 may include a "more" or "create" selection which triggers a sticker creation process.

Figure 4A:
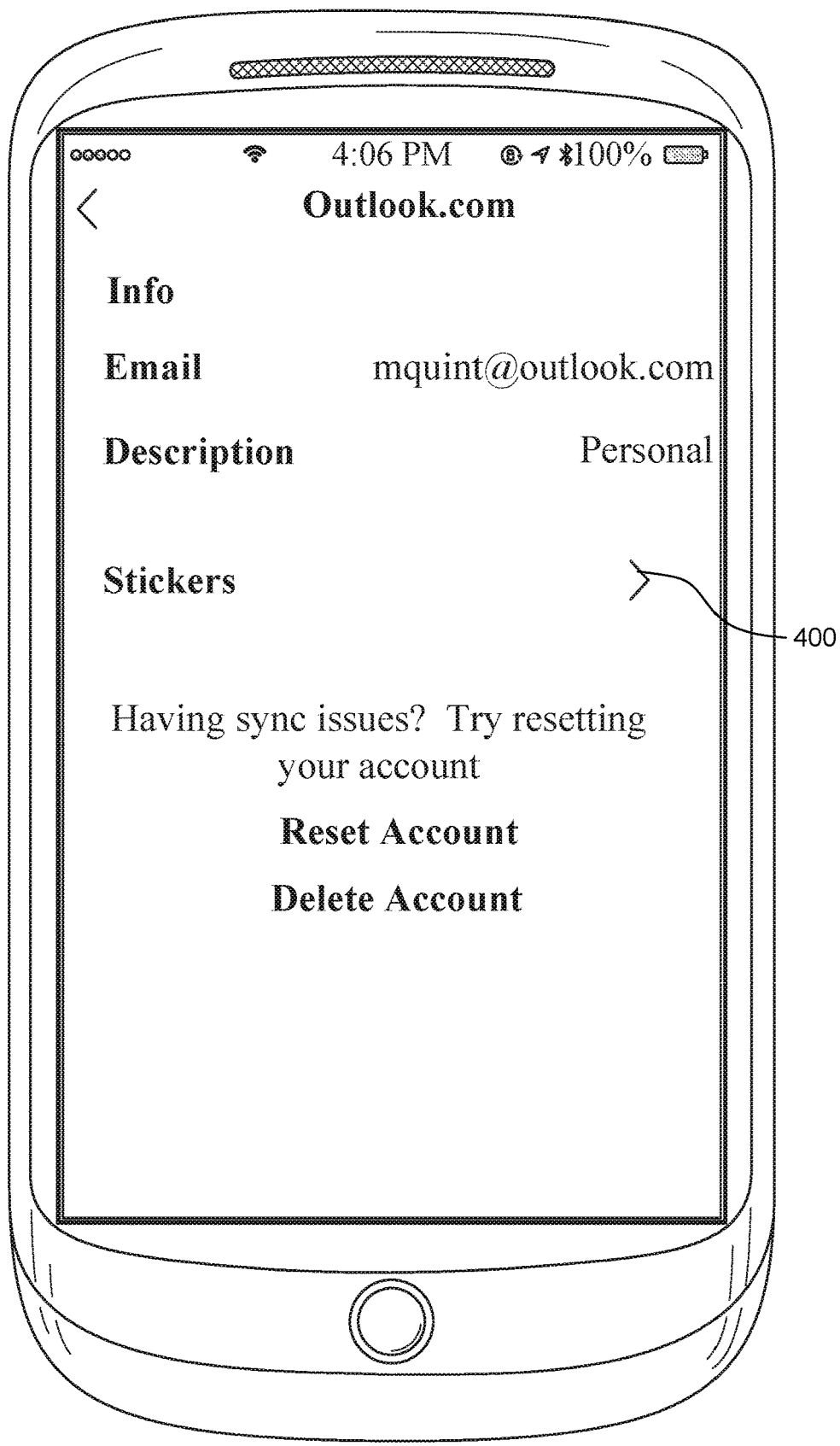
FIG. 4A-FIG. 4C illustrate user interfaces of an example flow for accessing existing stickers and creating a new sticker in accordance with an example embodiment.
Figure 4B:
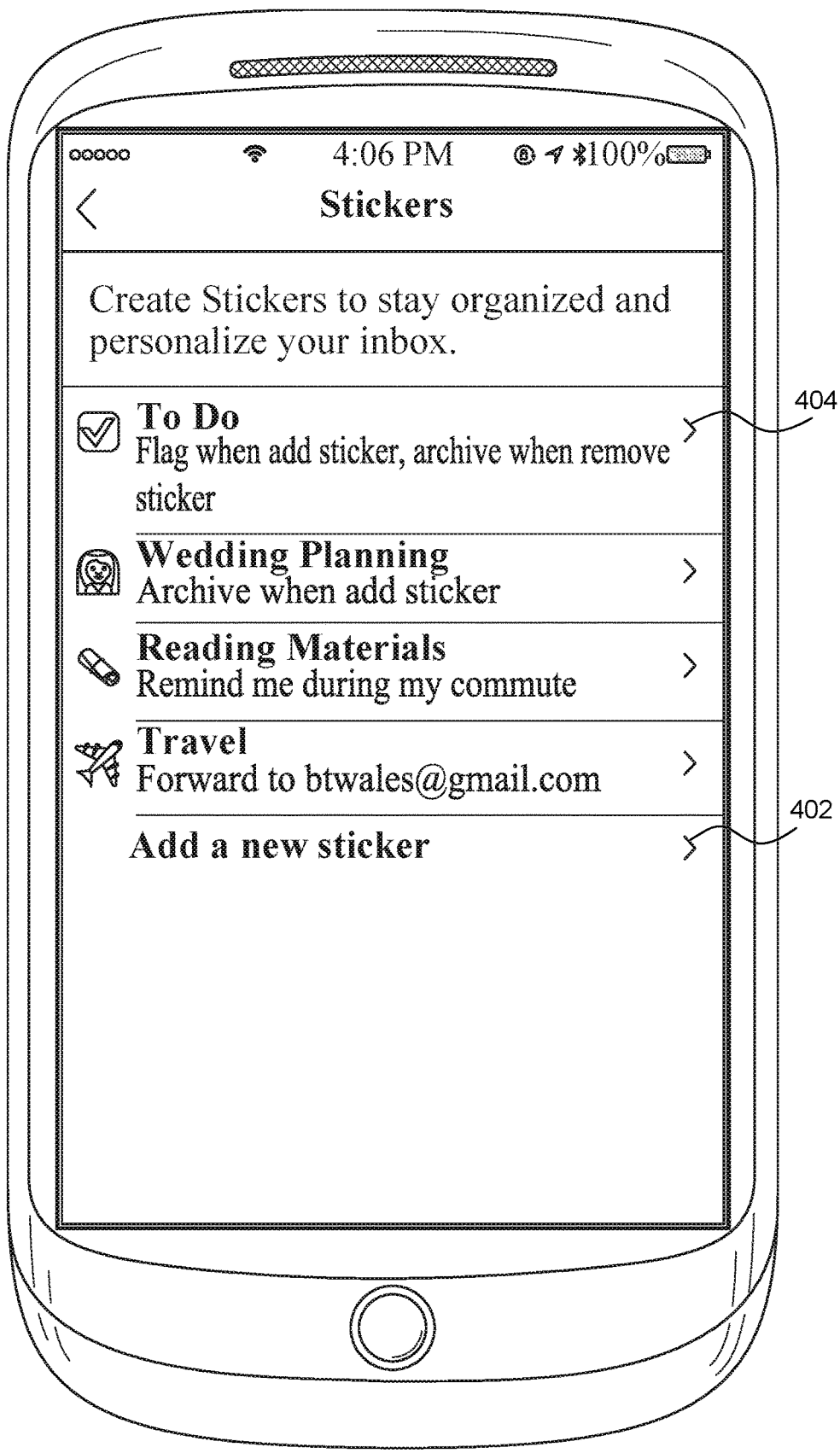
Figure 4C:
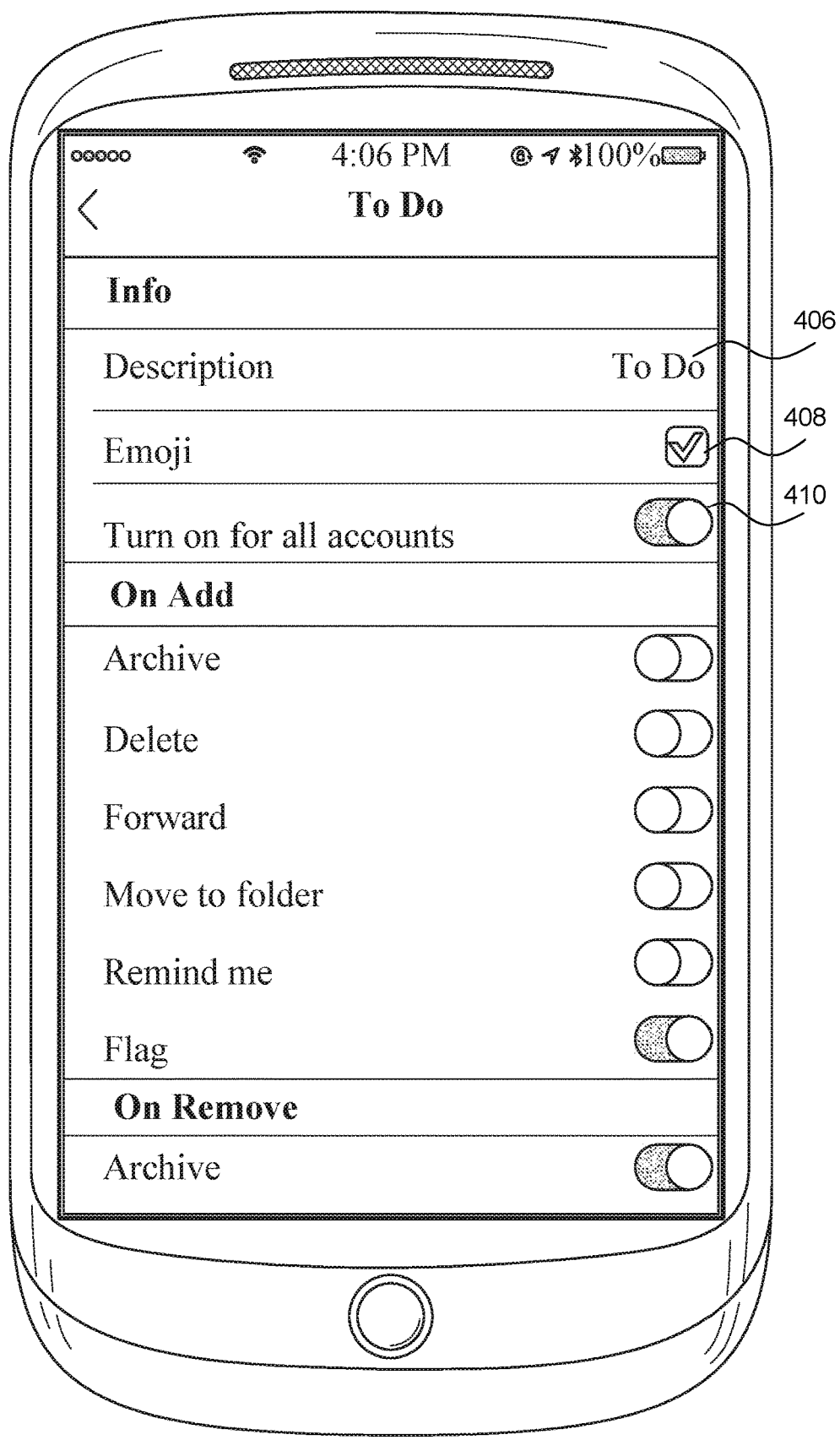

FIG. 4A-FIG. 4C illustrate user interfaces of an example flow for accessing existing stickers and creating a new sticker in accordance with an example embodiment. As discussed above, one embodiment for triggering the sticker creation process is during a classifying process for the data (e.g., if none of the stickers are applicable). Alternatively, the user may trigger the sticker creation process at any time from any application having taggable data. For instance, the user may trigger the sticker creation process while in an e-mail or calendaring application. FIG. 4A illustrates the user triggering the sticker creation process from within Microsoft Outlook while the user is operating their mobile device. In the present example, the user accesses their stickers, and thus will be creating a new sticker, from within a user interface to their e-mail account. As a result, the new sticker may be automatically associated with their e-mail account. In this case, the sticker will be associated with "mquint@outlook.com." The e-mail account is indicated as being a personal account versus a work account.

In example embodiments, the user selects a sticker selection 400 to access their stickers and to create the new sticker. The sticker selection 400 generates (e.g., causes display of) a stickers UI that includes a list of existing stickers to be presented on the mobile device (e.g., client device) as illustrated in FIG. 4B. The stickers UI also provides an "add a new sticker" selection 402.

If the user selects one of the existing stickers (e.g., the "To-Do" sticker 404), then attributes of the selected sticker are presented in a customization UI as shown in FIG. 4C. The user may modify any of the attributes by, for example, toggling between states for the attribute. For instance, the To-Do sticker is turned on for all accounts of the user (e.g., the sticker is available for all e-mail accounts of the user). Upon tagging or classifying an e-mail with the "To-Do" sticker, the e-mail will be flagged, and upon removal of the "To-Do" sticker, the e-mail will be archived.

Returning to FIG. 4B, if the user selects the "add a new sticker" selection 402, a customization UI similar to that shown in FIG. 4C is presented. In this case, the user can name the new sticker (e.g., in a description field 406), select an icon to associate with the new sticker in an emoji field 408, and indicate whether to have the new sticker available for all accounts of the user or only for the current account where the sticker is being created in an "Turn on for all accounts" field 410. The user can also indicate what one or more actions or rules to automatically apply when the new sticker is used to classify data (e.g., "On Add") or is removed from classified data (e.g., "On Remove") by toggling between states for the various actions or rules. For actions such as forward, move to folder, and archive, an additional field may be provided to indicate where to forward to, what folder to move to, and where to archive in, respectively. For the "remind me" action, a further field may be provided where the user can indicate when a reminder should be given.

The available actions and rules shown in FIG. 4C are merely examples and other actions or rules may be used. In some embodiments, the available actions or rules may be different for different stickers, different e-mail accounts, or different applications (e.g., e-mail application, calendar application, tasks application). Further still, in some embodiments, the user may add other actions or rules.

Figure 5:
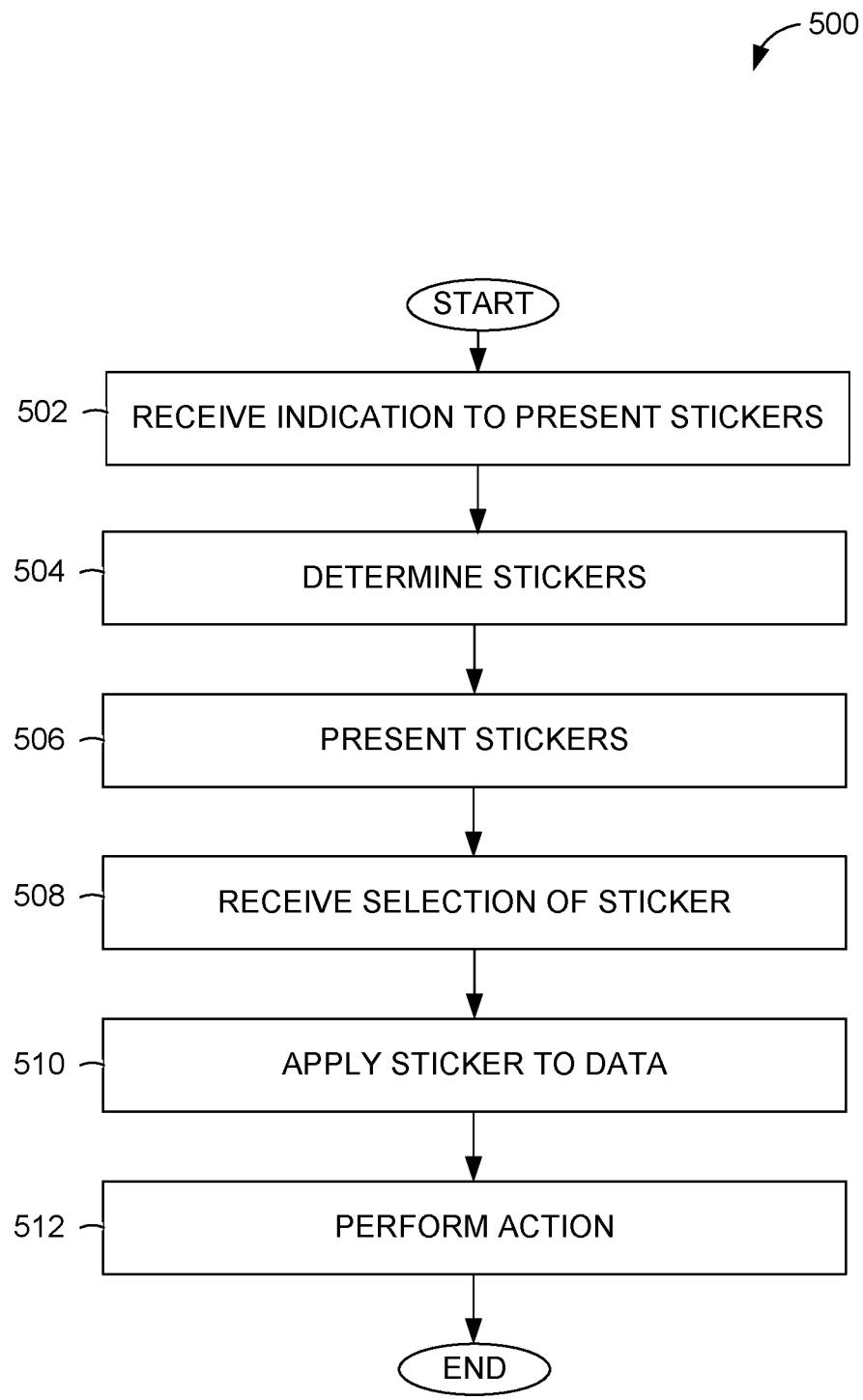
FIG. 5 is a flow diagram of an example method for applying a sticker to data.

FIG. 5 is a flow diagram of an example method 500 for applying a sticker to a data (e.g., classifying data). Operations in the method 500 may be performed by the server system 102, using components (e.g., modules, engines) described above with respect to FIG. 2. Accordingly, the method 500 is described by way of example with reference to the server system 102. However, it shall be appreciated that at least some of the operations of the method 500 may be deployed on various other hardware configurations or be performed by similar components residing elsewhere. For example, some of the operations may be performed at the receiver device. Therefore, the method 500 is not intended to be limited to the server system 102.

In operation 502, the server system 102 (e.g., the trigger module 208) receives an indication to present stickers that are applicable to data that is being presented to a user on their client device. For example, while viewing the data (e.g., an e-mail in an e-mail application, a calendar event in a calendar application), the user activates (e.g., selects, taps on) an icon or button that provides an indication (e.g., signal) to the trigger module 208 that the user wants to tag the data that the user is viewing.

In operation 504, the determination module 210 determines the applicable stickers to present to the user at the client device. In example embodiments, the determination module 210 identifies stickers that are most frequently used by the user or recently used by the user. Additionally, because some stickers may only be applicable (or relevant) to some types of data and not others, the determination module 210 determines most likely applicable stickers based on one or more attributes associated with the data being presented to the user. The attributes may comprise, for example, a sender or sender domain of the data, a category (e.g., e-mail classification) of the data, or a receiver e-mail account that receives the data. For example, in embodiments where the application is an e-mail application, the determination module 210 identifies stickers that are indicated to be applicable to the (receiver) e-mail account that received the data. Based on the attribute(s) the appropriate stickers are identified and/or prioritized (e.g., more likely stickers to be selected presented first) by the determination module 210.

The determined stickers are then presented in operation 506. In example embodiments, the determination module 210 provides the list of stickers to the user interface module 204, which causes presentation of the stickers on the client device (e.g., transmits instructions to the client device to present the stickers). For example, the list of stickers is provided in a menu that is overlaid over the presented data (e.g., presented as a menu over a displayed e-mail or calendar event).

In operation 508, the server system 102 (e.g., tagging module 212) receives a selection of one of the stickers from the presented list of stickers applicable to the data. In response to receiving the selection of the sticker, the sticker is applied to the data (e.g., the data is tagged or classified by the sticker) in operation 510. In example embodiments, the tagging module 212 tags the data, which causes the data to be classified based on the selected sticker. For example, if the selected sticker is a "travel" sticker, then the data is classified as travel data. The classification of the data (e.g., an association of the data with the sticker) is stored (e.g., in the data storage 206 or in the data itself) and is later used to access data that is classified or tagged with the same sticker (e.g., access all data tagged as "travel").

In operation 512, an action (or rule) associated with the sticker is automatically performed. For example, upon classifying the data, the data in may be automatically archived, deleted, forwarded, moved, flagged, or set a reminder (e.g., follow-up or snooze). Similarly, upon removal of the sticker from the data, the data may be automatically archived or deleted, for example. In various embodiments, operation 512 may be optional (e.g., when no action or rule is indicated in the attributes of the sticker).

It is noted that data may be classified with more than one sticker. As such, operations 506-512 may be performed more than once.

Figure 6:
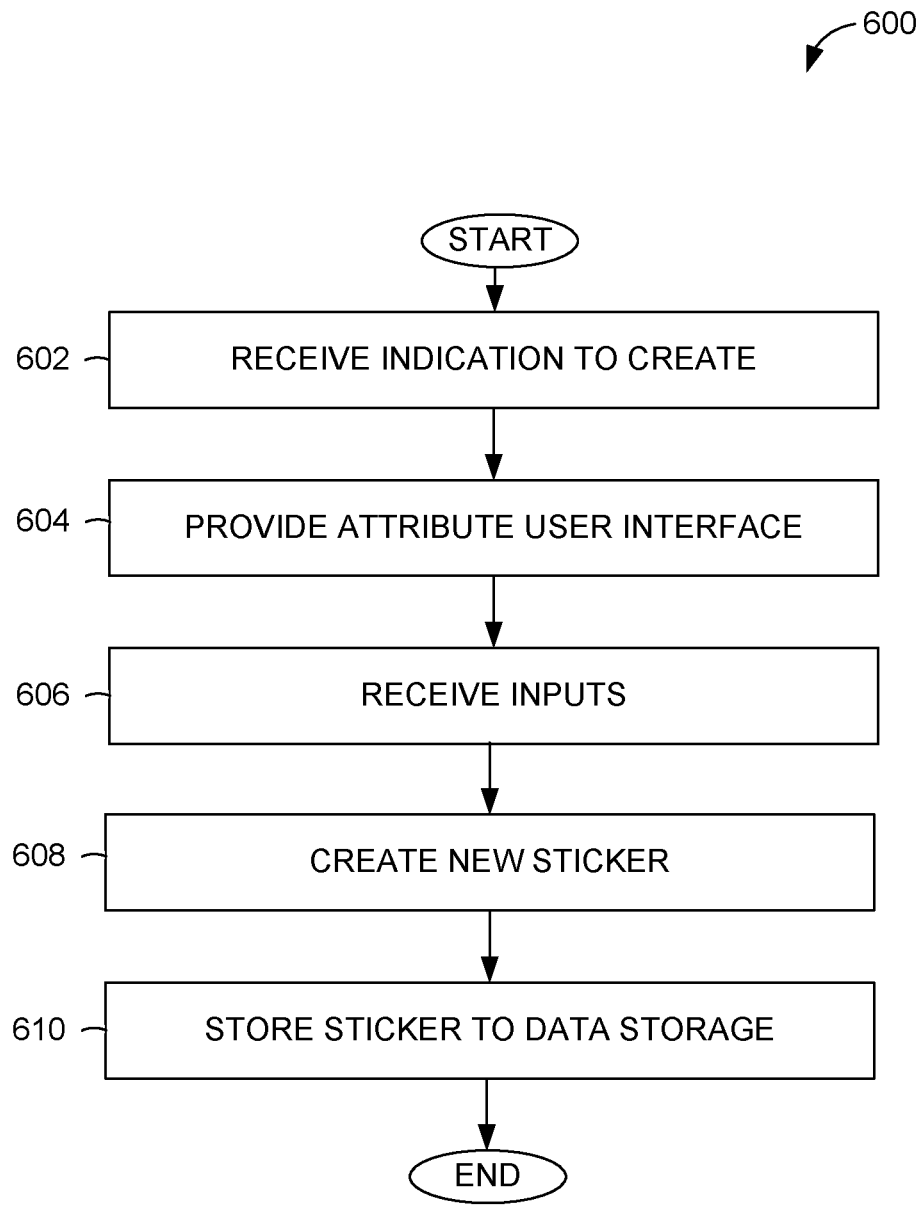
FIG. 6 is a flow diagram of an example method for creating a new sticker.

FIG. 6 is a flow diagram of a method 600 for creating a new sticker in accordance with example embodiments. Operations in the method 600 may be performed by the server system 102, using components (e.g., modules, engines) described above with respect to FIG. 2. Accordingly, the method 600 is described by way of example with reference to the server system 102, and in particular the creation module 214. However, it shall be appreciated that at least some of the operations of the method 600 may be deployed on various other hardware configurations or be performed by similar components residing elsewhere. For example, some of the operations may be performed at the receiver device. Therefore, the method 600 is not intended to be limited to the server system 102.

In operation 602, an indication to create a new sticker is received. Accordingly, the creation module 214 receives, from the client device, an indication to create a new sticker. The indication may be generated and sent from the client device as the user is viewing data and determines that suggested stickers are not applicable. Alternatively, the indication may be generated and sent by the client device at any other time the user wants to establish a new sticker (e.g., for a new project).

In operation 604, one or more customization user interfaces are provided to the user at the client device in response to receiving the indication to create the new sticker. In example embodiments, the creation module 214 instructs the user interface module 204 to provide the customization user interface(s).

In operation 606, inputs are received by the creation module 214. The inputs may include, for example, a name for the new sticker, a corresponding emoji or icon representing the new sticker, and activation (e.g., toggle, check box selection) of one or more actions or rules that apply to the new stickers. The actions or rules may be automatically performed on the data upon tagging of the data with the new sticker or upon removal of the new sticker from tagged data. In some embodiments, the creation module 214 receives an indication of one or more receiver e-mail accounts of the user that the new sticker is to be associated with resulting in the new sticker only being suggested for the indicated receiver e-mail account(s).

In operation 608, the new sticker is created by the creation module 214 based on inputs received via the one or more customization user interfaces. Once created, the new sticker along with its attributes are stored to data storage (e.g., the data storage 206).

Figure 7:
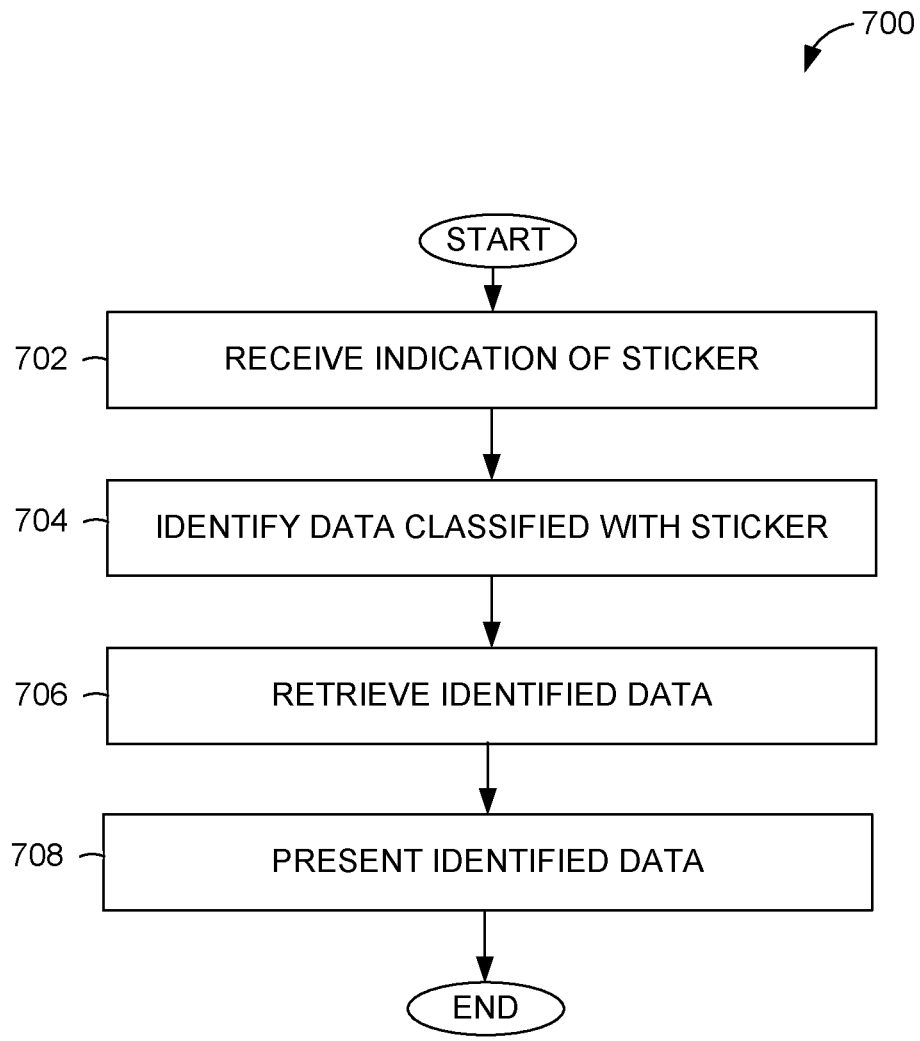
FIG. 7 is a flow diagram of an example method for accessing tagged data.

FIG. 7 is a flow diagram of a method 700 for accessing tagged or classified data in accordance with example embodiments. Operations in the method 700 may be performed by the server system 102, using components (e.g., modules, engines) described above with respect to FIG. 2. Accordingly, the method 700 is described by way of example with reference to the server system 102, and in particular the data access module 216. However, it shall be appreciated that at least some of the operations of the method 700 may be deployed on various other hardware configurations or be performed by similar components residing elsewhere. For example, some of the operations may be performed at the receiver device. Therefore, the method 700 is not intended to be limited to the server system 102.

In operation 702, an indication of a sticker is received by the data access module 216. The indication of the sticker represents a category or classification of data that the user is interested is accessing. For example, if the indication is "travel," the user is interested in accessing and viewing all data classified as travel data. In some embodiments, the indication is received while the user is viewing a piece of classified data and decides to view other data classified with the same sticker (e.g., indication is the selected sticker itself). In other embodiments, the data access module 216 receives an input (e.g., keyword) in a search box (e.g., via the interface module 204) that indicates a category or name of a sticker. In embodiments where more than one sticker (e.g., classification) is identified (e.g., based on a keyword search in the search box), the data access module 216 presents (e.g., via the interface module 204) the set of identified stickers to the user from which the indication of the sticker the user is interested in is selected.

In operation 704, the data access module 216 identifies data that is classified with the selected sticker. Accordingly, the data access module 216 accesses data storage (e.g., the data storage 206) and identifies data that is tagged or classified by the indicated sticker. The data may comprise e-mails, calendar events, files, to-do lists, or any other types of taggable data. As such, classified data can be accessed and compiled from more than one application (e.g., e-mail application, calendar application, to-do list application) and/or from more than one data storage. In operation 706, the identified data is retrieved by the data access module 216.

In operation 708, the identified data is presented to the user at the client device. Accordingly, the data access module 216 provides the retrieved data (or provide an indication of the retrieved data) to the user interface module 204, which causes (e.g., transmits instructions to generate a user interface comprising the retrieved data, transmits the retrieved data, or transmits the user interfaces) the retrieved data to be presented at the client device.

Figure 8:
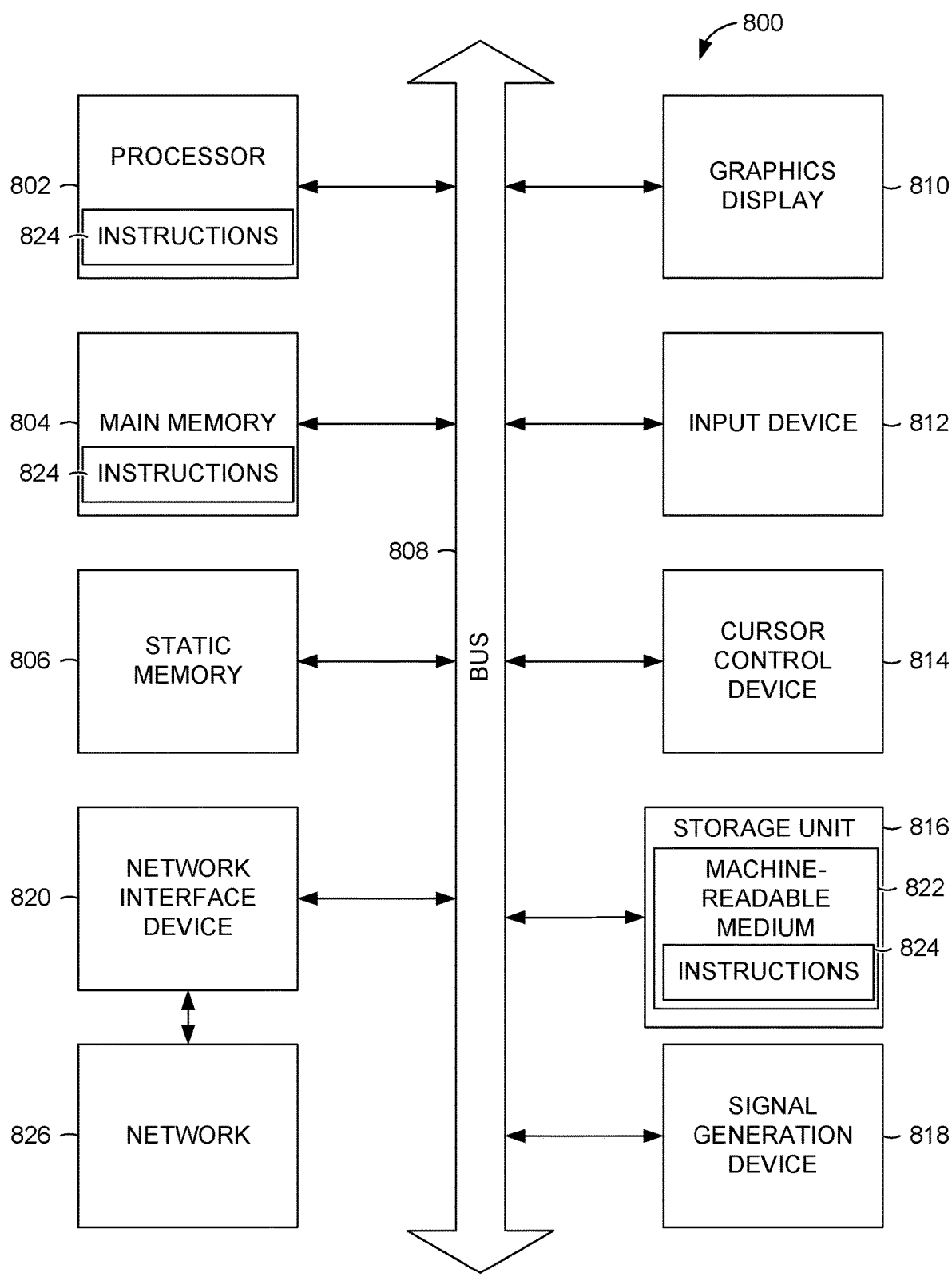
FIG. 8 is a diagrammatic representation of a machine in an example form of a computing system within which a set of instructions may be executed for causing the machine to perform any one or more of the methodologies discussed herein, according to an example embodiment.

FIG. 8 is a block diagram illustrating components of a machine 800, according to some example embodiments, able to read instructions 824 from a machine-storage medium 822 and perform any one or more of the methodologies discussed herein, in whole or in part. Specifically, FIG. 8 shows the machine 800 in the example form of a computer device (e.g., a computer) within which the instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flows and flow diagrams of FIGS. 3-7. The instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. The machine 800 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 800 capable of executing the instructions 824, sequentially or otherwise, that specify actions to be taken by that machine 800. Further, while only a single machine 800 is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-storage medium 822 on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-storage media 822 (e.g., tangible and non-transitory machine-readable media).

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 822 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" or "signal medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 822 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a system for organizing data using stickers. The system includes one or more processors and a storage medium storing instructions that, when executed by the one or more hardware processors, causes the one or more hardware processors to perform operations comprising determining a plurality of stickers applicable to data presented on a user interface of a client device; causing presentation of the determined plurality of stickers on the user interface of the client device; receiving a selection of a sticker from the plurality of stickers; applying the selected sticker to the presented data, the applying causing the presented data to be classified based on the selected sticker.

In example 2, the subject matter of example 1 can optionally include wherein the determining the plurality of stickers comprises determining one or more stickers that are most frequently used by the user; and including the one or more stickers that are most frequently used in the plurality of stickers.

In example 3, the subject matter of examples 1-2 can optionally include wherein the presented data comprises an e-mail and the determining the plurality of stickers comprises identifying a sender domain of the e-mail, a category type associated with the e-mail, or a receiver e-mail account that receives the e-mail; and selecting one or more stickers that are associated with the sender domain, the category type, or the receiver e-mail account that receives the e-mail.

In example 4, the subject matter of examples 1-3 can optionally include wherein the operations further comprise receiving, from the client device, an indication to create a new sticker; providing, to the client device, one or more customization user interfaces for creating the new sticker, the one or more customization user interfaces including a description field for the new sticker and fields for indicating one or more actions that automatically occur upon application or removal of the new sticker; creating the new sticker based on inputs received via the one or more customization user interfaces; and updating, based on the new sticker, a data storage associated with a user of the client device.

In example 5, the subject matter of examples 1-4 can optionally include receiving an indication of a sticker for which a user is interested in viewing data classified with the indicated sticker; in response to the receiving of the indication of the sticker, determining data that is classified with the indicated sticker; and causing the data that is classified with the indicated sticker to be presented on the client device.

Example 6 is a method for organizing data using stickers. The method comprises determining, by one or more hardware processors, a plurality of stickers applicable to data presented on a user interface of a client device; causing presentation of the determined plurality of stickers on the user interface of the client device; receiving a selection of a sticker from the plurality of stickers; and applying the selected sticker to the presented data, the applying causing the presented data to be classified based on the selected sticker.

In example 7, the subject matter of example 6 can optionally include wherein the classified data comprises an e-mail, a calendar entry, a task, a document, or a file.

In example 8, the subject matter of examples 6-7 can optionally include wherein the determining the plurality of stickers comprises determining one or more stickers that are most frequently used by the user; and including the one or more stickers that are most frequently used in the plurality of stickers.

In example 9, the subject matter of examples 6-8 can optionally include wherein the presented data comprises an e-mail; and the determining the plurality of stickers comprises identifying a sender domain of the e-mail, and selecting one or more stickers that are associated with the sender domain.

In example 10, the subject matter of examples 6-9 can optionally include wherein the presented data comprises an e-mail; and the determining the plurality of stickers comprises identifying a category associated with the e-mail, and selecting one or more stickers that are associated with the category.

In example 11, the subject matter of examples 6-10 can optionally include wherein the presented data comprises an e-mail; and the determining the plurality of stickers comprises identifying a receiver e-mail account that receives the e-mail message, and selecting one or more stickers that are associated with the receiver e-mail account.

In example 12, the subject matter of examples 6-11 can optionally include receiving, from the client device, an indication to create a new sticker; providing, to the client device, one or more customization user interfaces for creating the new sticker, the one or more customization user interfaces including a description field for the new sticker and fields for indicating one or more actions that automatically occur upon application or removal of the new sticker; creating the new sticker based on inputs received via the one or more customization user interfaces; and updating, based on the new sticker, a data storage associated with a user of the client device.

In example 13, the subject matter of examples 6-12 can optionally include receiving an indication of one or more receiver e-mail accounts of the user that the new sticker is to be associated with, the new sticker only being usable with the indicated one or more receiver e-mail accounts; and associating the new sticker with the one or more receiver e-mail accounts in the data storage.

In example 14, the subject matter of examples 6-13 can optionally include receiving an indication of a sticker for which a user is interested in viewing data classified with the indicated sticker; in response to the receiving of the indication of the sticker, determining data that is classified with the indicated sticker; and causing the data that is classified with the indicated sticker to be presented on the client device.

In example 15, the subject matter of examples 6-14 can optionally include wherein the receiving the indication of the sticker occurs as the user is viewing a piece of classified data.

In example 16, the subject matter of examples 6-15 can optionally include receiving an input in a search box; determining, based on a data storage of stickers associated with the user, that the input corresponds to one or more stickers utilized by the user; and presenting the one or more stickers to the user from which the indication of the sticker is selected.

In example 17, the subject matter of examples 6-16 can optionally include wherein the selected sticker has an associated action, the action being automatically performed in response to removal of the selected sticker from the classified data.

In example, 18, the subject matter of examples 6-17 can optionally include wherein the selected sticker has an associated action, the action being automatically performed in response to application of the selected sticker to the classified data.

In example 19, the subject matter of examples 6-18 can optionally include receiving a selection of a second sticker from the plurality of stickers; and classifying the presented data with the second sticker resulting in the presented data being classified with more than one sticker.

Example 20 is a machine-storage medium for organizing data using stickers. The machine-storage medium configures one or more processors to perform operations comprising determining a plurality of stickers applicable to data presented on a user interface of a client device; causing presentation of the determined plurality of stickers on the user interface of the client device; receiving a selection of a sticker from the plurality of stickers; and applying the selected sticker to the presented data, the applying causing the presented data to be classified based on the selected sticker.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
   one or more hardware processors; and
   a storage medium storing instructions that, when executed by the one or more hardware processors, causes the one or more hardware processors to perform operations comprising:
   causing presentation of a customization user interface that enables a user to configure a sticker, the customization user interface comprising options for actions that are performed in response to applying the sticker and removing the sticker, an option for a corresponding action being activated in response to a toggle input between states associated with the option;
   receiving, via the customization user interface, the toggle input to activate the option for the sticker;
   receiving an indication to present a plurality of stickers applicable to data presented on a user interface to organize the data;
   in response to the receiving the indication, determining the plurality of stickers applicable to the data presented on the user interface, the determining being based on one or more attributes of the data being presented via the user interface;
   causing presentation of the determined plurality of stickers on the user interface;
   receiving a selection of the sticker from the plurality of stickers;
   in response to receiving the selection of the sticker, applying the sticker to the presented data, the applying comprising causing a sticker icon representing the sticker to be displayed as part of the data and causing the presented data to be classified based on the sticker; and
   upon application of the sticker to the presented data, automatically performing a user-customized action previously established for the sticker via the customization user interface.

2. The system of claim 1, wherein the determining the plurality of stickers comprises:
   determining one or more stickers that are most frequently used by the user; and
   including the one or more stickers that are most frequently used in the plurality of stickers.

3. The system of claim 1, wherein:
   the presented data comprises an e-mail; and
   the determining the plurality of stickers applicable to the data to organize the data comprises:
   identifying a sender domain of the e-mail, a category type associated with the e-mail, or a receiver e-mail account, of a plurality of receiver e-mail accounts, that receives the e-mail; and
   selecting one or more stickers that correspond to the sender domain, the category type, or the receiver e-mail account that receives the e-mail.

4. The system of claim 1, wherein the operations further comprise:
   receiving an indication to create a new sticker;
   providing the customization user interface for creating the new sticker, the customization user interface including a description field to name the new sticker, an icon field to select an icon associated with the new sticker, an account field to indicate whether the new sticker is applicable to all accounts of the user, and fields for indicating one or more actions that automatically occur upon application or removal of the new sticker;
   creating the new sticker based on user inputs received via the customization user interface; and
   updating, based on the new sticker, a data storage associated with the user.

5. The system of claim 1, wherein the operations further comprise:
   receiving an indication of a second sticker for which the user is interested in viewing data classified with the second sticker;
   in response to the receiving of the indication of the second sticker, determining data that is classified with the second sticker; and
   causing the data that is classified with the second sticker to be presented to the user.

6. A method comprising:
   causing presentation of a customization user interface that enables a user to configure a sticker, the customization user interface comprising options for actions that are performed in response to applying the sticker and removing the sticker, an option for a corresponding action being activated in response to a toggle input between states associated with the option;
   receiving, via the customization user interface, the toggle input to activate the option for the sticker;
   receiving an indication to present a plurality of stickers applicable to data presented on a user interface to organize the data;
   in response to the receiving the indication, determining, by one or more hardware processors, the plurality of stickers applicable to the data presented on the user interface, the determining being based on one or more attributes of the data being presented via the user interface;
   causing presentation of the determined plurality of stickers on the user interface;
   receiving a selection of the sticker from the plurality of stickers;
   in response to the selection of the sticker, applying the sticker to the presented data, the applying comprising causing a sticker icon representing the sticker to be displayed as part of the data and causing the presented data to be classified based on the sticker; and
   upon application of the sticker to the presented data, automatically performing a user-customized action previously established for the sticker via the customization user interface.

7. The method of claim 6, wherein the classified data comprises an e-mail, a calendar entry, a task, a document, or a file.

8. The method of claim 6, wherein the determining the plurality of stickers comprises:
determining one or more stickers that are most frequently used by the user; and
including the one or more stickers that are most frequently used in the plurality of stickers.

9. The method of claim 6, wherein:
the presented data comprises an e-mail; and
the determining the plurality of stickers comprises identifying a sender domain of the e-mail and selecting one or more stickers that are associated with the sender domain.

10. The method of claim 6, wherein:
the presented data comprises an e-mail; and
the determining the plurality of stickers comprises identifying a category associated with the e-mail and selecting one or more stickers that are associated with the category.

11. The method of claim 6, wherein:
the presented data comprises an e-mail; and
the determining the plurality of stickers comprises identifying a receiver e-mail account that receives the e-mail message and selecting one or more stickers that are associated with the receiver e-mail account.

12. The method of claim 6, further comprising:
receiving an indication to create a new sticker;
providing the customization user interface for creating the new sticker, the customization user interface including a description field to name the new sticker, an icon field to select an icon associated with the new sticker, an account field to indicate whether the new sticker is applicable to all accounts of the user, and fields for indicating one or more actions that automatically occur upon application or removal of the new sticker;
creating the new sticker based on inputs received via the customization user interfaces; and
updating, based on the new sticker, a data storage associated with the user.

13. The method of claim 12, further comprising:
receiving an indication of one or more receiver e-mail accounts of the user that the new sticker is to be associated with, the new sticker only being usable with the indicated one or more receiver e-mail accounts; and
associating the new sticker with the one or more receiver e-mail accounts in the data storage.

14. The method of claim 6, further comprising:
receiving an indication of a sticker for which the user is interested in viewing data classified with the indicated sticker;
in response to the receiving of the indication of the sticker, determining data that is classified with the indicated sticker; and
causing the data that is classified with the indicated sticker to be presented to the user.

15. The method of claim 14, wherein the receiving the indication of the sticker occurs as the user is viewing a piece of classified data.

16. The method of claim 14, further comprising:
receiving an input in a search box;
determining, based on a data storage of stickers associated with the user, that the input corresponds to one or more stickers utilized by the user; and
presenting the one or more stickers to the user from which the indication of the sticker is selected.

17. The method of claim 6, further comprising:
detecting removal of the sticker from the classified data; and
in response to the detecting the removal of the sticker from the classified data, automatically performing the user-customized action corresponding to the removal of the sticker.

18. The method of claim 6, further comprising:
receiving a selection of a second sticker from the plurality of stickers; and
classifying the presented data with the second sticker resulting in the presented data being classified with more than one sticker.

19. A machine-storage medium storing instructions that, when executed by one or more processors of a machine, cause the one or more processors to perform operations comprising:
causing presentation of a customization user interface that enables a user to configure a sticker, the customization user interface comprising options for actions that are performed in response to applying the sticker and removing the sticker, an option for a corresponding action being activated in response to a toggle input between states associated with the option;
receiving, via the customization user interface, the toggle input to activate the option for the sticker:
receiving an indication to present a plurality of stickers applicable to data presented on a user interface to organize the data;
in response to the receiving the indication, determining the plurality of stickers applicable to the data presented on the user interface, the determining being based on one or more attributes of the data being presented via the user interface;
causing presentation of the determined plurality of stickers on the user interface;
receiving a selection of the sticker from the plurality of stickers;
in response to the selection of the sticker, applying the sticker to the presented data, the applying comprising causing a sticker icon representing the sticker to be displayed as part of the data and causing the presented data to be classified based on the sticker; and
upon application of the sticker to the presented data, automatically performing a user-customized action previously established for the sticker via the customization user interface.

* * * * *